United States Patent [19]

Anderson

[11] Patent Number: 4,756,234
[45] Date of Patent: Jul. 12, 1988

[54] VACUUM AND ELECTRIC CRUISE CONTROL ACTUATOR

[75] Inventor: Patrick J. Anderson, Wheaton, Ill.

[73] Assignee: Eaton Corporation, Cleveland, Ohio

[21] Appl. No.: 105,150

[22] Filed: Oct. 2, 1987

Related U.S. Application Data

[63] Continuation of Ser. No. 783,039, Oct. 2, 1985, abandoned.

[51] Int. Cl.4 .................... F15B 11/08; F15B 13/044; B60K 31/00
[52] U.S. Cl. ........................................ 91/454; 91/459; 180/178
[58] Field of Search ................. 91/449, 456, 459, 454; 123/352, 353; 180/179, 178

[56] References Cited

U.S. PATENT DOCUMENTS

| | | |
|---|---|---|
| Re. 27,324 | 3/1972 | Granger et al. |
| 3,109,507 | 11/1963 | McMurray et al. |
| 3,381,771 | 5/1968 | Granger et al. |
| 3,444,950 | 5/1969 | Vitvlugt |
| 3,455,411 | 7/1969 | Carp et al. |
| 3,599,052 | 8/1971 | Carp et al. |
| 3,722,614 | 3/1973 | Sakakibara et al. |
| 3,766,367 | 10/1973 | Sumiyoshi et al. |
| 3,921,751 | 11/1975 | Sakakibara et al. |
| 4,039,043 | 8/1977 | Mann et al. |
| 4,105,088 | 8/1978 | Levijoki |
| 4,133,406 | 1/1979 | Allerdist |
| 4,158,192 | 6/1979 | Muto |
| 4,202,424 | 5/1980 | Sakakibara et al. |
| 4,218,997 | 8/1980 | Hunt |
| 4,249,457 | 2/1981 | Sakakibara .......................... 91/459 |
| 4,335,799 | 6/1982 | Shields |
| 4,336,857 | 6/1982 | Hunt |
| 4,345,663 | 8/1982 | Shields |
| 4,346,775 | 8/1982 | Treadwell |
| 4,352,403 | 10/1982 | Burney |
| 4,359,125 | 11/1982 | Shinoda et al. |
| 4,431,077 | 2/1984 | Burney |
| 4,456,831 | 6/1984 | Kanegea et al. |

Primary Examiner—Douglas Hart
Attorney, Agent, or Firm—R. A. Johnston

[57] ABSTRACT

A speed control actuator includes a diaphragm forming a movable wall of a variable pressure chamber. An output member is fixed to the diaphragm to impart diaphragm movement to a throttle valve of the automotive vehicle. Three solenoid valves are mounted on a common bracket and are disposed in the variable pressure chamber for controlling vacuum and atmospheric pressure into the chamber. Two of the three solenoid valves are normally biased open to assure disengagement of the actuator.

5 Claims, 3 Drawing Sheets

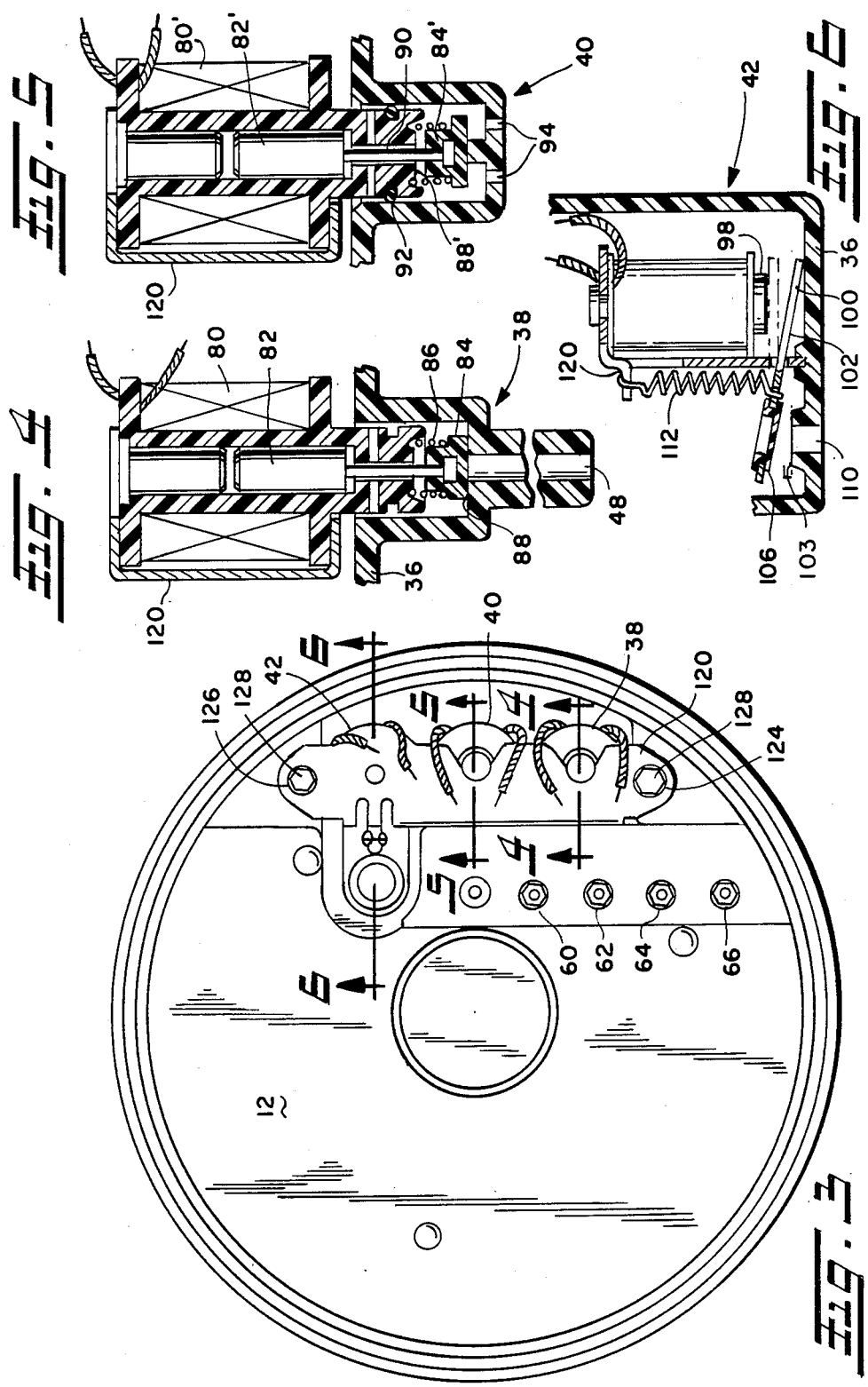

VACUUM AND ELECTRIC CRUISE CONTROL ACTUATOR

This application is a continuation of application Ser. No. 783,039, filed Oct. 2, 1985, now abandoned.

BACKGROUND OF THE INVENTION

This invention pertains to the art of servomotors and, more particularly, to diaphragm actuators. The invention is particularly applicable to automotive speed control systems and will be described with particular reference thereto. However, it will be appreciated that the invention has broader applications and may be advantageously employed in other actuator environments.

Various speed control devices are described in the prior art, e.g. U.S. Pat. Nos. 3,444,950 and 4,346,775. The servomotor or actuator assemblies generally include a variable pressure chamber sensitive to pressure changes therein for controlling the throttle valve of an associated automotive engine. Early developments focused on mechanical arrangements that alternately controlled vacuum and atmospheric ports opening into the variable pressure chamber. Pressure is regulated by control valves to the pressure chamber for movement of a movable pressure chamber wall. The application of logic circuit controls to the mechanical arrangements has increased greatly and altered speed control structures in the past few years. Along with this advent, a reduced complexity in the mechanical assembly of the speed control actuator has taken place.

The prior art has used valve arrangements that are considered undesirable for a number of reasons. For example, the valve arrangements have been positioned on the exterior of the actuator housing. Not only is a great deal of space required, but the valving is also exposed to possible damage. Prior arrangements have also required actuation of a valve from a first position to a second position in order to deactivate the servomotor. This requirement of an overt action to disengage the servomotor can be relatively dangerous since the consequences of the actuator remaining engaged are serious.

It has, therefore, been considered desirable to simplify the structure of the speed control actuator. In such simplification, it has been determined that emphasis should be placed on incorporating the valve structure into the speed control actuator housing for greater protection from the external environment. In this manner, the logic control of the actuator may be mounted externally of the housing with only a simplified connection required therebetween. Additionally, provision is desired for automatic disengagement of the actuator. The subject invention is deemed to meet the foregoing needs and others in an economical and efficient manner.

SUMMARY OF THE INVENTION

In accordance with the subject invention, a servomotor or actuator for controlling the speed of a vehicle includes a housing having a first fixed wall and a second movable wall forming a variable pressure chamber therebetween. Plural valves are protectively disposed in the pressure chamber for controlling movement of the second wall through regulation of vacuum and atmospheric pressures into the pressure chamber.

In accordance with another aspect of the invention, a dump valve is included and is normally biased open for disengaging the actuator.

In accordance with still another aspect of the invention, the plural valves comprise first, second, and third valves that are operatively connected to a common bracket prior to insertion of the valve assembly into the variable pressure chamber.

A principal advantage of the subject invention is the provision of an actuator assembly in which the number of components or elements is effectively reduced.

A further advantage of the invention resides in the fact that the valves are shielded within the actuator housing to prevent damage thereto.

A still further advantage of the subject invention is found in a safety feature accorded through use of a normally biased open dump valve.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment which will be described in detail in this specification and illustrated in the accompanying drawings which form a part hereof and wherein:

FIG. 3 is an interior plan view of the right hand side of the actuator housing shown in FIG. 1;

FIG. 4 is a view taken along the lines 4—4 of FIG. 3;

FIG. 5 is a view taken along the line 5—5 of FIG. 3; and,

FIG. 6 is a view taken along the line 6—6 of FIG. 3.

DETAILED DESCRIPTION OF THE PREFERRED EMBODIMENT

Figure 1:
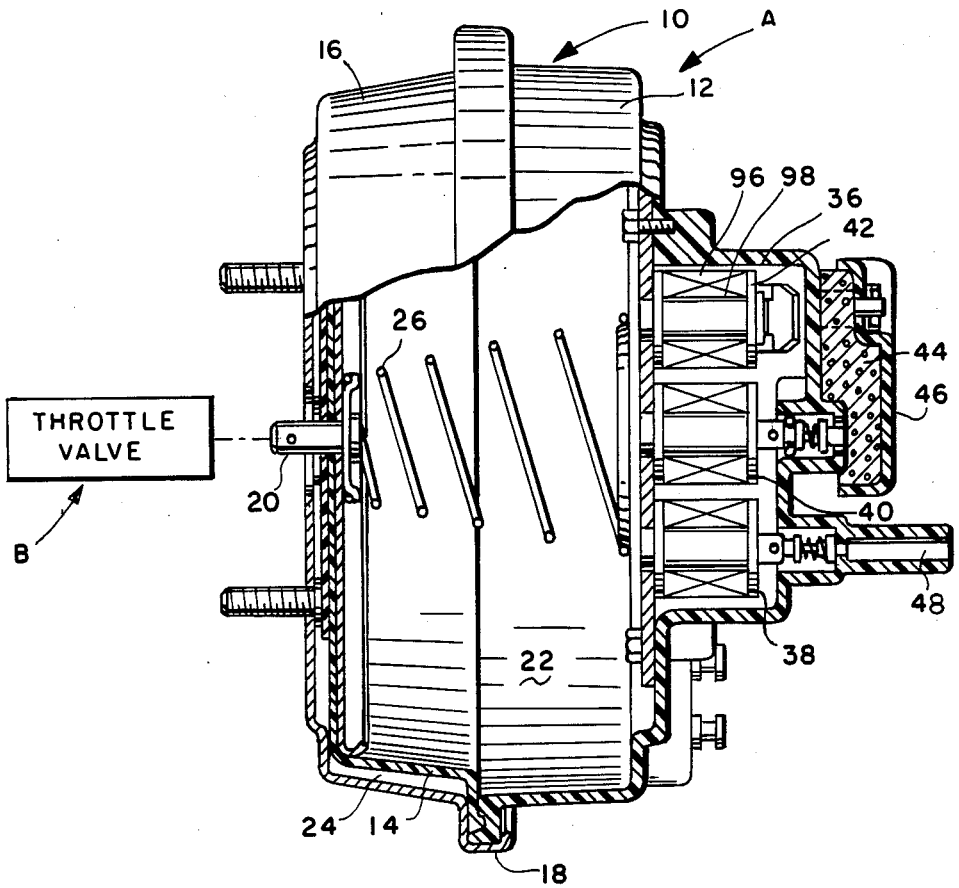
FIG. 1 is a partial cross-sectional view of the actuator housing formed in accordance with the subject invention.

Referring now to the drawings wherein the showings are for purposes of illustrating the preferred embodiment of the invention only and not for purposes of limiting same, the FIGURES show a speed control actuator or servomotor for selectively controlling the throttle valve of an associated vehicle. More specifically, the FIGURES illustrate an actuator A adapted for connection with a throttle valve B as it receives signals from a logic control unit C. One of ordinary skill in the speed control actuator art will understand that a conventional connection between the actuator and throttle valve is contemplated in FIG. 1. For example, a beaded chain assembly or the like may extend between the actuator housing and the throttle valve. As is generally known, movement of a wall member in the actuator imparts movement through a connection member of the throttle valve in an automotive engine. Once a desired vehicle speed is chosen by the vehicle operator, the pressure in a variable pressure chamber is controlled, thereby effectively stabilizing the throttle valve and resulting speed of the vehicle.

With particular reference to FIG. 1, the actuator housing 10 includes a first rigid wall 12 adapted for sealing relation with a second flexible wall 14, such as a diaphragm. A third rigid wall 16 surrounds the diaphragm and is connected to the first rigid wall along an outer peripheral portion 18. An output member 20 extends from connection with the diaphragm 14 through the rigid wall 16 for connection with the throttle valve of a motor vehicle. Thus, movement of the diaphragm is transferred through the output member for corresponding movement of the throttle valve as described above.

The first, second, and third walls form a pair of chambers 22, 24. The first chamber 22 is defined between the first rigid wall 12 and the diaphragm 14. This chamber is subjected to variations in pressure as will be described hereinbelow, while the second chamber, as defined by the diaphragm and third wall is introduced to constant pressure. Such pressure commonly comprises atmospherical pressure which is provided by suitable openings (not shown) arranged in the third wall 16. Movement of the diaphragm will increase the volume of one chamber while decreasing the volume of the other chamber since the diaphragm wall 14 is common to both the first and second chambers. A biasing means such as spring 26 extends between the diaphragm and first wall 12 for normally biasing the diaphragm toward the third wall 16.

The first wall 12 includes a recessed portion forming a cavity 36 adapted to receive first, second, and third solenoid valves 38, 40, 42 therein. The cavity is formed over a minor portion of the first wall and closely receives the vales, further reducing the space occupied by the actuator housing. A filter member 44 is arranged for operative cooperation with two of the three solenoid valves and may be positioned on the exterior of the actuator housing by means of retaining cover 46. A vacuum port 48 also extends through the first rigid wall 12 of the actuator housing for communication with the remaining solenoid valve. The vacuum port is shown in connection with a source of vacuum pressure, for example, the intake manifold of the automotive vehicle. One skilled in the art will understand that other sources of vacuum pressure may be utilized within the spirit of the subject invention. The valves regulate the inlet of vacuum and atmospheric pressure into chamber 22 as will be described in greater detail below.

Figure 2:
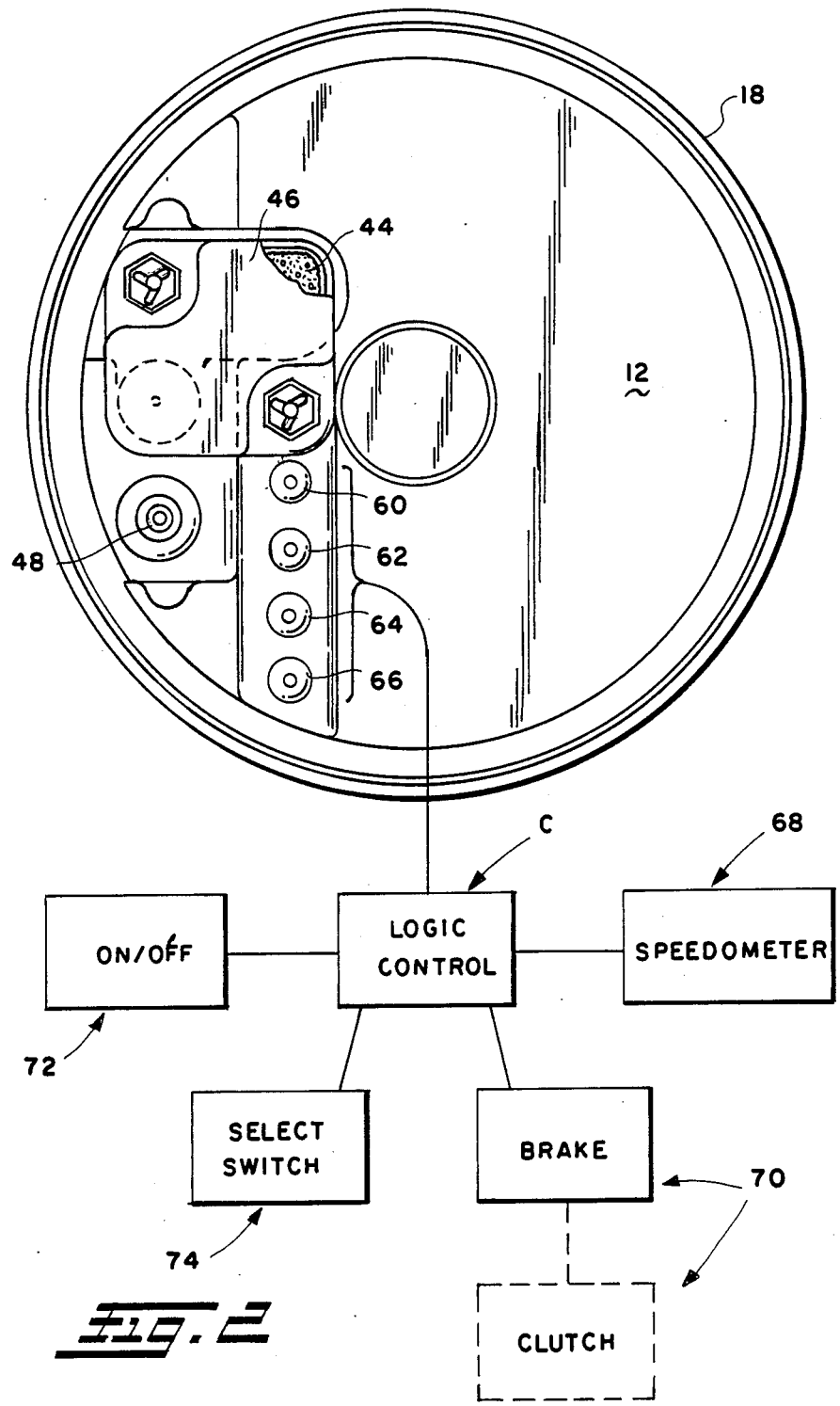
FIG. 2 is an end view of the actuator housing shown in FIG. 1 along with a schematic control diagram.

As particularly seen in FIG. 2, a plurality of electric contact terminals 60, 62, 64, 66, are also disposed on the exterior portion of the first wall 12. The terminals are interconnected with the logic control unit of the automotive vehicle which typically comprises an on-board microprocessor. The contact terminals extend through the first wall 12 whereby electrical connections may be formed between the terminals and solenoid valves. The specific details of the logic control unit need not be described in great detail for a thorough understanding of the invention but are generally represented in FIG. 2 as incorporating inputs from a road speed generator 68, a brake pedal and/or clutch 70, an on/off switch 72, and a select switch 74. The logic control unit compares the actual and desired speeds of the vehicle and dictates which of the solenoid valves is actuated. In the preferred embodiment, one of the four terminals 60, 62, 64, 66 is a common power terminal while the remaining three are connected to ground. Logic control of the power and ground terminals allows an electrical circuit to be selectively completed through the solenoid valves. In this manner, the speed of the automotive vehicle may be selectively chosen by the operator, the actual speed sensed, and adjustments made to the mechanical actuator to compensate for any differences that may exist. Details of this process will be described below in greater detail.

With particular reference to FIGS. 1, 3, 4, 5, and 6, the solenoid valves will be specifically described. The first solenoid valve 38 (FIGS. 1, 3 and 4) is adapted to selectively control the vacuum pressure through the port 48. The solenoid valve includes coil winding 80 disposed about a core member 82 having a valve member 84 disposed at one end thereof. Application of electric current to the coils sets up a magnetic field so hat the core member 82 is moved longitudinally within the coil winding in a manner well known in the art. A spring member 86 exerts a normally outward biasing force on the core member in opposition to the magnetic field so that in the absence of electric current, the valve member 84 is usually seated with respect to the vale seat 88 in the vacuum port. Therefore, control of the current to the coil winding 80 controls the movement of the valve member 84 with respect to valve seat 88. The valve seat 88 is preferably formed adjacent the vacuum inlet port, such as, for example, directly on the first wall of the actuator housing. The valve member may be formed of a soft, sealing material to assure a sealing relationship with the valve seat. In this manner, vacuum pressure is introduced into the variable pressure chamber 22.

The second solenoid valve 40 (FIGS. 1, 3, and 5) may be of substantially identical construction to the first solenoid valve 38. Like elements are described by like numerals with a primed (') suffix while new elements are described by new numerals. A coil winding 80' is disposed in surrounding relationship with a core member 82' having a valve member 84' disposed at one end. The valve is biased to an open position through the use of a spring member 86'. The valve member 84' is formed of a soft sealing material and cooperates with a valve seat 88' disposed at one end of an internal passageway 90. Therefore, the valve seat is disposed between the coil winding and valve member 84' so that the spring biases the assembly to a normally open position. In this manner, the valve member is continuously urged away from the associated valve seat 88'. A seal, such as O-ring 92, prevents communication of fluid pressure about the exterior of the solenoid valve, as is used in the vacuum solenoid valve 38 arrangement. The second solenoid valve 40 is adapted to control fluid flow from port 94 which communicates with atmospheric pressure through the filter member 44. In a similar manner, actuation of the valve is achieved through current supplied to the coil winding whereby the core member is moved in opposition to the biasing force exerted by the spring member. Movement of the core of the normally biased open valve closes the inlet of atmospheric pressure.

The logic control unit controls the current sent to the contact terminals 60, 62, 64, 66. Vacuum and atmospheric pressure supplied through the vacuum port 48 and the atmospheric valve port 94 subjects the diaphragm wall 14 to movement toward and away from the first rigid wall 12. Preselection by the vehicle operator of the desired speed is processed by the logic control unit which varies the current sent to the valve coils. By varying the current, the supply of atmospheric and vacuum pressures is selectively controlled to the actuator. If the speed control system is not activated, the normally closed vacuum valve 38 and normally open valve 40 provide atmospheric pressure to the variable chamber 22. The net force provided by spring 26 positions the diaphragm in a deactivated state. Control of the throttle vale is unaffected by the speed control actuator in the deactivated state.

The third solenoid valve 42 (FIGS. 1, 3, and 6) is of somewhat different construction from the first and second solenoid valves. Once again, current is presented to a coil winding 96 (FIG. 1) of the third solenoid valve. Energization of the coil winding sets up a magnetic force from the core member 98 which is held in fixed relationship with the coil winding. The magnetic force is designed to attract one end 100 of biased valve member 102. The other end 104 of the valve member includes a sealing material 106 adapted for engagement with valve seat 108 disposed at valve port 110. The port 110 is over-sized and designed to provide a quick dump or safety release orifice for the actuator. A spring member 112 extends from the valve member 102 to a mounting bracket 120 to normally bias the third valve 42 into an open position. The normally biased open dump valve 42 provides a further safety feature to ensure that the variable pressure chamber is connected to atmospheric pressure.

Brake engagement by the vehicle operator disconnects current to the solenoid valve 42 so that spring 112 immediately biases the valve open and atmospheric pressure is presented to the variable pressure chamber through the over-sized orifice. Therefore, the variable pressure chamber 22 is normally subjected to atmospheric pressure through the valve port 110. Closure of the third or dump valve 42 allows the vehicle operator to set the speed control of the vehicle through regulation of the vacuum and atmospheric pressures through the ports 48, 94, respectively.

Opening the valve port 48 allows the inlet of vacuum pressure to the variable pressure chamber thereby moving the diaphragm wall 14 toward the rigid wall 12 in a manner overcoming the biasing force of the spring 26. Admission of atmospherica pressure through valve port 94 will equalize the pressure in the first chamber 22 with that in the second chamber 24 whereby the diaphragm wall 14 will move toward the third rigid wall 16. Therefore, as is apparent, selective control of the vacuum and atmospheric ports will control movement of the diaphragm wall and, in turn, movement of the output member 20 and the throttle valve of the automotive vehicle.

More specifically, a vehicle operator desiring automotive speed control actuates the system through on/off switch 72 which provides electrical power to the actuator assembly. The vehicle is accelerated to the desired speed whereby the set switch 74 is actuated. The actual speed of the vehicle is monitored through the road speed generator input so that the desired and actual speeds are calibrated by the logic control unit and appropriate electrical signals transmitted to the solenoid valves. The third solenoid valve 42 is closed and the first and second valves 38, 40 regulate movement of the diaphragm 14. Actuation of the vehicle brakes or clutch in a manual transmission, by the operator deactuates the third solenoid valve whereby it is spring biased open. The variable pressure chamber is quickly brought to atmospheric pressure due to over-sized port 110 so that the speed control servomotor is deactivated. Speed control of the vehicle is then controlled through the accelerator pedal.

The mounting bracket 120 is generally U-shaped and designed to retainingly receive the three solenoid valves 38, 40, 42. The valve member 102 of the dump valve 42 is also pivotally anchored to the bracket. As described above, the spring 112 is anchored to the bracket while the valve member 102 is centrally pivoted for biasing the valve into an open position. The mounting bracket 120 has a pair of openings 124, 126 which receive conventional fasteners 128, such as screws or the like. The bracket permits the solenoid valves to be mounted to the bracket outside the actuator housing. In this manner, once the solenoid valves are secured to the bracket, the bracket may thereafter be fastened within the cavity 36 through use of fasteners 128. Manufacture of the actuator is thereby simplified through the use of the mounting bracket since adept manipulation of the solenoid valves is not required. Instead, the mounting bracket is secured as a whole within the cavity with the valve members aligning with their respective valve ports.

The bracket 120 serves a second important function. The bracket is formed of meal in order to facilitate conduction of the flux along the exterior of the solenoid valve. When current is presented to the valve coil, a magnetic flux is created which travels along an axial path generally defined through the center of the coil. The flux field is also present along the exterior of the solenoid valve as it completes a generally circular path from one end of the coil to the other end. The use of a metal bracket conducts the flux so that the flux field passing along the exterior is advantageously focused. Better force characteristics are thereby achieved through use of the metal bracket.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A differential pressure servomotor of the type employed in a speed control system on a vehicle comprising:
    a housing having a first generally fixed wall portion and a second generally flexible wall portion, said walls forming a variable pressure chamber therebetween;
    said housing fixed wall portion defining a first port adapted for connection in said chamber with a source of vacuum and a first solenoid having an armature movably received in said solenoid with a poppet valve member provided on one end of said armature and aligned with said first port for selectively opening and closing said first port for communicating vacuum pressure to said variable pressure chamber;
    said housing fixed wall portion defining a second port in said chamber adapted for communicating with atmospheric pressure and a second solenoid having an armature movably received in said second solenoid with a poppet valve member provided on one end of said armature and aligned with said second port in the direction of motion of said armature opening and closing said second port for communicating atmospheric pressure to said variable pressure chamber;
    said housing fixed wall portion defining a third port in said chamber adapted to supplied with atmospheric pressure and a third normally open solenoid having a valve member pivoted about a point adjacent said third solenoid for selectively opening and closing said third port for communicating atmospheric pressure to said variable pressure chamber independently of said second port;

a recess in a generally flat surface of said first wall portion said recess receiving said first, second, and third valves in said variable pressure chamber; and, a bracket receiving said first, second, and third valves whereby said valves may be pre-assembled on said bracket before placement in said recess to facilitate manufacture of said servomotor.

2. The servomotor as defined in claim 1, wherein said third valve includes an elongated member mounted for rotational movement about a pivot with, one end of said elongated member adapted for sealing engagement with said port.

3. The servomotor as defined in claim 1, wherein said third valve includes a biasing means and said bracket further includes means for anchoring one end of said third biasing means.

4. The servomotor as defined in claim 1, wherein said bracket further includes means for pivoting said third valve along an intermediate portion of said third valve.

5. The servomotor defined in claim 1, wherein said first, second and third solenoids are aligned on said bracket.

* * * * *